(12) United States Patent
Wu (10) Patent No.: US 9,529,167 B2
(45) Date of Patent: *Dec. 27, 2016

(54) OPTICAL CABLE MODULE AND METHOD FOR MANUFACTURING THE SAME

(71) Applicant: Liseen Corporation, Zhubei, Hsinchu County (TW)

(72) Inventor: Chang-cherng Wu, Zhubei (TW)

(73) Assignee: LISEEN CORPORATION, Zhubei, Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/542,687

(22) Filed: Nov. 17, 2014

(65) Prior Publication Data

US 2015/0346448 A1 Dec. 3, 2015

(30) Foreign Application Priority Data

May 30, 2014 (CN) .......................... 2014 1 0238957

(51) Int. Cl.
| | |
|---|---|
| *G02B 6/44* | (2006.01) |
| *G02B 6/00* | (2006.01) |
| *D03D 15/00* | (2006.01) |
| *F21V 8/00* | (2006.01) |
| *G02B 6/38* | (2006.01) |
| *G02B 6/42* | (2006.01) |

(52) U.S. Cl.
CPC ............. *G02B 6/4401* (2013.01); *G02B 6/001* (2013.01); *G02B 6/3817* (2013.01); *G02B 6/4284* (2013.01); *G02B 6/4403* (2013.01); *G02B 6/4416* (2013.01); *G02B 6/4486* (2013.01); *Y10T 29/49828* (2015.01)

(58) Field of Classification Search
CPC ...... G02B 6/001; G02B 6/4401; G02B 6/3817
USPC 385/100, 101, 114, 134, 147, 901; 362/551, 553, 554, 556
See application file for complete search history.

(56) References Cited

U.S. PATENT DOCUMENTS

| | | | |
|---|---|---|---|
| 6,347,172 B1 * | 2/2002 | Keller .................. | G02B 6/0006 385/102 |
| 7,108,413 B2 | 9/2006 | Kwong et al. | |
| 8,582,943 B2 | 11/2013 | Alkemper et al. | |
| 8,620,123 B2 * | 12/2013 | Dean, Jr. ............ | G02B 6/02033 385/100 |

(Continued)

FOREIGN PATENT DOCUMENTS

| | | |
|---|---|---|
| JP | S5896502 U | 6/1983 |
| JP | H07113919 A | 5/1995 |

(Continued)

*Primary Examiner* — Robert Tavlykaev
(74) *Attorney, Agent, or Firm* — Hauptman Ham, LLP (57) ABSTRACT

An optical cable module and a method for manufacturing the same are disclosed. The optical cable module comprises a connector and an optical cable, and the optical cable is connected to the connector. A wavelength of at least one optical signal emitted from a laser of the connector is in a range of 380 nm to 980 nm. The optical cable comprises at least one optical fiber and an outer cladding layer, and the outer cladding layer surrounds the optical fiber, and the outer cladding layer includes at least one transparent portion, and at least one portion of the optical signal is leaked from the optical fiber and passes through the transparent portion to the surrounding environment.

26 Claims, 8 Drawing Sheets

(56) References Cited

U.S. PATENT DOCUMENTS

| | | | | |
|---|---|---|---|---|
| 2002/0037133 A1* | 3/2002 | Unsworth | ............... | G02B 6/001 385/31 |
| 2004/0146254 A1* | 7/2004 | Morrison | ............... | G02B 6/447 385/100 |
| 2007/0237472 A1* | 10/2007 | Aronson | ............... | G02B 6/4292 385/101 |
| 2010/0226145 A1* | 9/2010 | Yu | ........................ | G02B 6/001 362/561 |
| 2014/0363134 A1* | 12/2014 | Bookbinder | ......... | G02B 6/4401 385/100 |
| 2015/0043875 A1* | 2/2015 | Bookbinder | ......... | G02B 6/4482 385/100 |

FOREIGN PATENT DOCUMENTS

| | | |
|---|---|---|
| JP | 200366291 A | 3/2003 |
| JP | 2011514551 A | 5/2011 |
| JP | 2013198567 A | 10/2013 |
| JP | 2014038204 A | 2/2014 |
| TW | 200535481 A | 11/2005 |

\* cited by examiner

OPTICAL CABLE MODULE AND METHOD FOR MANUFACTURING THE SAME

FIELD OF THE INVENTION

The present invention relates to an optical cable module and a method for manufacturing the same, and more particularly to an optical cable module using at least one optical fiber to transmit signals, and at least one cable thereof has an optical color identification

BACKGROUND OF THE INVENTION

At present, the demand for computing devices continues to rise, even as the demand for computing devices to achieve higher performance also rises. However, conventional electrical I/O (input/output) signaling is not expected to keep pace with the demand for performance increases, especially for future high performance computing expectations. Currently, I/O signals are sent electrically to and from the processor through the board and out to peripheral devices. Electrical signals must pass through solder joints, cables, and other electrical conductors. Therefore, electrical I/O signal rates are limited by the electrical characteristics of the electrical connectors.

While the use of optical interconnections is finding increasing use in computing devices, currently the components used for optical signaling require special processing that increases the cost and complexity of system manufacturing. In addition, optical cables for optical signals are still required to be improved for other demands, such as the demand for exterior appearances.

SUMMARY OF THE INVENTION

A primary object of the present invention is to provide an optical cable module comprising a photoelectric component and an optical cable. The connector comprises a photoelectric component, wherein the photoelectric component includes at least one laser for producing at least one optical signal, and a wavelength of at least one optical signal is in a range of 380 nm to 980 nm. The optical cable is connected to the connector for transmitting the at least one optical signal, wherein the optical cable comprises at least one optical fiber and an outer cladding layer, and the outer cladding layer surrounds the at least one optical fiber, and the outer cladding layer includes at least one transparent portion, and at least one portion of the optical signal is leaked from the optical fiber and passes through the transparent portion to the surrounding environment.

A secondary object of the present invention is to provide a method for manufacturing an optical cable module, wherein the method comprises: providing a connector, wherein the connector comprises a photoelectric component, and the photoelectric component includes at least one laser for producing at least one optical signal, and a wavelength of at least one optical signal is in a range of 380 nm to 980 nm; providing an optical cable, and connecting the optical cable to the connector, wherein the optical cable comprises at least one optical fiber and an outer cladding layer, and the outer cladding layer surrounds the at least one optical fiber, and the outer cladding layer includes at least one transparent portion, and at least one portion of the optical signal is leaked from the optical fiber and passes through the transparent portion to the surrounding environment; and reducing a coupling efficiency between the optical fiber of the optical cable and the laser.

A further object of the present invention is to provide an optical cable module comprising a photoelectric component and an optical cable. The connector comprises a photoelectric component, wherein the photoelectric component includes at least one laser for producing a plurality of optical signals, and a wavelength of at least one of the plurality of optical signals is within the range of the visible light spectrum. The optical cable is connected to the connector for transmitting the at least one optical signal, wherein the optical cable comprises at least one optical fiber and an outer cladding layer, and the outer cladding layer surrounds the at least one optical fiber, and the outer cladding layer includes at least one transparent portion and at least one opaque portion, and at least one portion of the optical signal is leaked from the optical fiber and passes through the transparent portion to the surrounding environment, and a material and/or a diameter of the transparent portion is different from a material and/or a diameter of the opaque portion.

In various embodiments of the present invention, the wavelength of at least one optical signal is in a range of 380 nm to 680 nm.

In various embodiments of the present invention, the at least one optical signal comprises a plurality of optical signals, and a wavelength of at least one of the plurality of optical signals is within the range of the visible light spectrum.

In various embodiments of the present invention, the at least one optical fiber comprises a plurality of optical fibers corresponding to the plurality of optical signals.

In various embodiments of the present invention, a coupling efficiency of at least one of optical fibers between a plurality of lasers is less than coupling efficiencies of the other optical fibers between the lasers.

In various embodiments of the present invention, all parts or large parts of the outer cladding layer are transparent.

In various embodiments of the present invention, more than 80% of the outer cladding layer can be transparent.

In various embodiments of the present invention, the cladding layer further includes at least one opaque portion, and the opaque portion is positioned at one side of the transparent portion, or between the transparent portions.

In various embodiments of the present invention, a flexibility of the transparent portion is greater than a flexibility of the opaque portion.

In various embodiments of the present invention, a material and/or diameter of the transparent portion is different from a material and/or a diameter of the opaque portion, thereby forming the different flexibility there-between.

In various embodiments of the present invention, a difference between refractive indexes of the optical fiber and the transparent portion is less than a difference between refractive indexes of the optical fiber and the opaque portion.

In various embodiments of the present invention, the outer cladding layer further includes at least one reflective portion, and the at least one reflective portion is positioned in the transparent portion or on a surface of the transparent portion.

In various embodiments of the present invention, the reflective portion is made of a metal with a high reflectivity, and embedded in the transparent portion.

In various embodiments of the present invention, the transparent portion has an inner surface and an outer surface, wherein the inner surface is in contact with the optical fiber, and the outer surface is in contact with the external or the surrounding environment. The light rays (the optical signal)

leaked from the optical fiber may pass through the inner surface and the outer surface toward the surrounding environment.

In various embodiments of the present invention, the material of the opaque portion may be identical to or different from the material of the transparent portions, and the transparent portion and the opaque portion may be arranged in any shape or in any manner.

In various embodiments of the present invention, the transparent portion and the opaque portion may be alternately arranged in the outer cladding layer.

In various embodiments of the present invention, a cross-sectional shape of the opaque portion is U-shaped, and the transparent portion is embedded in the recess of the U-shaped opaque portion.

In various embodiments of the present invention, the coupling efficiency between the optical fiber and the laser can be reduced by slightly deviating the optical fiber from the coupler. In one embodiment, the coupling efficiency between the optical fiber and the laser can be reduced by slightly varying a lens curvature of a lens of the coupler. By reducing the coupling efficiency of the optical fiber, a specific proportion of the laser light will be scattered to the outer cladding layer and transmitted along a direction of the optical fiber. In this case, with the use of the transparent portion close to the connector, when the optical cable module is connected to the peripheral device, the visible light penetrating through the transparent portion can more apparently indicate a using status of the optical cable module, especially in a dark room or dark environment.

In various embodiments of the present invention, the reduced coupling efficiency between the optical fiber and the laser is less than 70%.

In various embodiments of the present invention, the optical cable has the plurality of optical fibers, and a coupling efficiency of at least one of optical fibers is less than coupling efficiencies of the other optical fibers.

In various embodiments of the present invention, the optical cable has the plurality of optical fibers, and multiple wavelengths can be used to achieve a specific mixed light of a mixed optic color for indicating a specific signal transmission in the optical cable.

In various embodiments of the present invention, the optical cable further comprises a power line, and the outer cladding layer surrounds and covers the optical fibers and the power line, and the power line is configured to supply an electrical power. With the use of the power line integrated into the optical cable, the optical cable can directly supply the power to electronic device without connecting to an external power source.

In various embodiments of the present invention, the optical fibers and the power line are arranged as a honeycomb-shaped manner. In that manner, the structure of the optical cable can be strengthened, thereby improving the mechanical strength and reliability of the optical cable, as well as reducing the requirements for repairs or maintenance.

In various embodiments of the present invention, the power line is made of a metal with a high reflectivity and positioned in the middle of the optical fibers, and the optical fibers can surround the power line. Therefore, the visible light rays leaked from the optical fibers can be reflected by the power line, and pass through the transparent portion, and the visibility and appearance of the optical cable can be improved.

In various embodiments of the present invention, the optical cable further comprises at least two metal lines, and the outer cladding layer can surround and cover the optical fibers and the metal lines. At least one of the metal lines can supply electrical power. In the optical cable, the at least two metal lines are symmetrically arranged in the outer cladding layer.

In various embodiments of the present invention, the optical cable can be rolled and received in a reel for easily carrying.

In comparison with the conventional optical cable, the optical cable module of the present invention can indicate the using status thereof, and the optical cable of the optical cable module can have varied colors for promoting the appearance thereof, thereby being suitable for consumer electronic products.

The structure and the technical means adopted by the present invention to achieve the above-mentioned and other objects can be best understood by referring to the following detailed description of the preferred embodiments and the accompanying drawings:

DETAILED DESCRIPTION OF THE PREFERRED EMBODIMENTS

The following embodiments are referring to the accompanying drawings for exemplifying specific implementable embodiments of the present invention. Furthermore, directional terms described by the present invention, such as upper, lower, front, back, left, right, inner, outer, side, etc., are only directions by referring to the accompanying drawings, and thus the used directional terms are used to describe and understand the present invention, but the present invention is not limited thereto.

The drawings and description are to be regarded as illustrative in nature and not restrictive. Like reference numerals designate like elements throughout the specification. In addition, the size and thickness of each component shown in the drawings allow ease of understanding and ease of description, but the present invention is not limited thereto.

In the drawings, the thickness of layers, films, panels, regions, etc., are exaggerated for clarity. In the drawings, for understanding and ease of description, the thicknesses of some layers and areas are exaggerated. It should be understood that, when an element such as a layer, film, region, or substrate is referred to as being "on" another element, it can be directly on the other element or intervening elements may also be present.

In addition, in the specification, unless explicitly described to the contrary, the word "comprise" and variations such as "comprises" or "comprising" will be understood to imply the inclusion of stated elements but not the exclusion of any other elements. Furthermore, in the specification, "on" implies being positioned above or below a target element and does not imply being necessarily positioned on the top with respect to the direction of gravitational pull.

Figure 1:
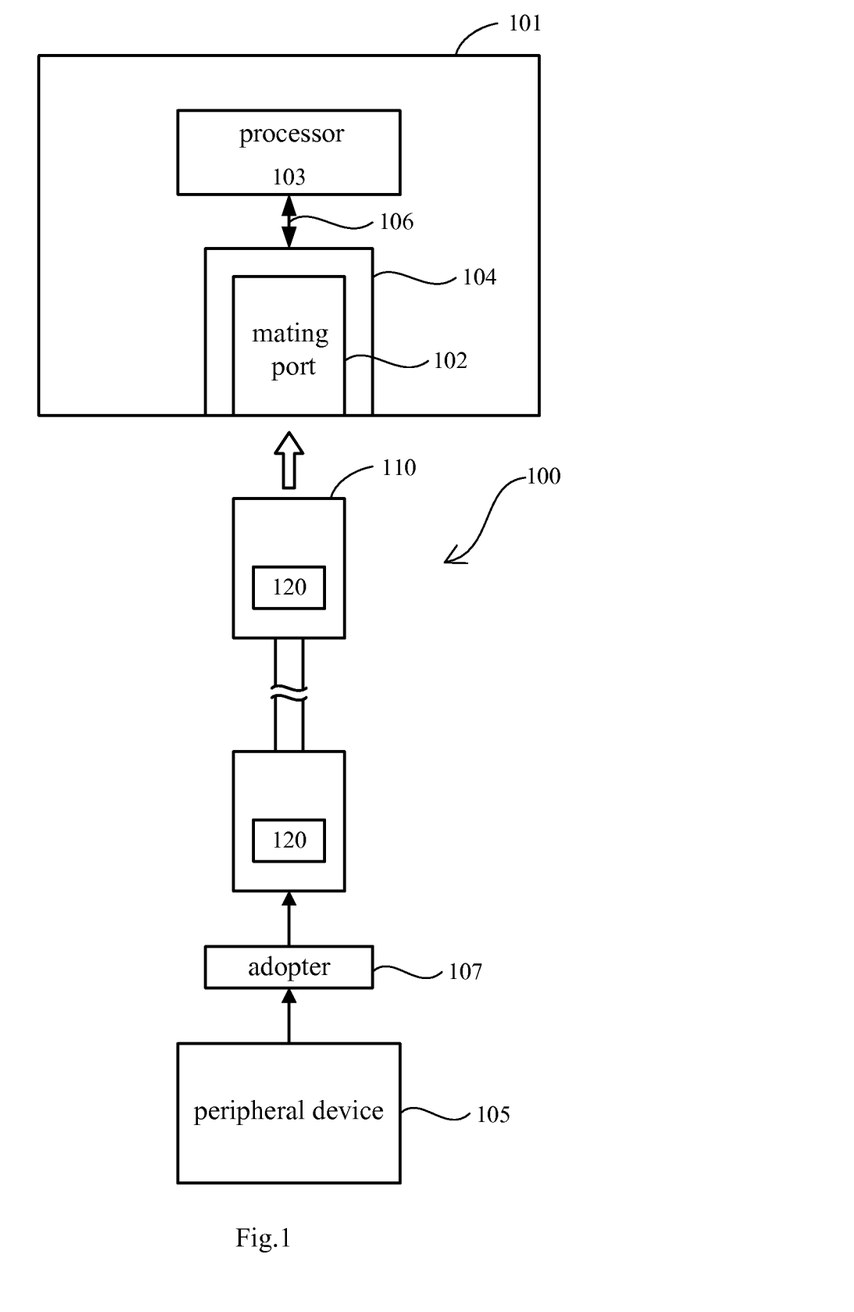
FIG. 1 is a block diagram showing an optical interface according to one embodiment of the present invention.

FIG. 1 is a block diagram showing an optical interface according to one embodiment of the present invention. The optical cable module 100 of present invention comprises a connector 110 and an optical cable 130 for transmitting signals, such as video or data signals, to an electronic device 101. The electronic device 101 may be any of a number of computing devices, including, but not limited to, a desktop or laptop computer, a notebook, a tablet, a netbook, an Ultrabook, or other such computing devices. Besides computing devices, it should be understood that many other types of electronic devices may incorporate one or more of the types of the connector 110 and/or mating port 102 herein, and the embodiments described herein would apply equally well in such electronic devices. Examples of other such electronic devices may include handheld devices, smartphones, media devices, ultra-mobile personal computers, personal digital assistants (PDA), mobile phones, multimedia devices, memory devices, cameras, voice recorders, I/O devices, servers, set-top boxes, printers, scanners, monitors, televisions, electronic billboards, projectors, entertainment control units, portable music players, digital video recorders, networking devices, gaming devices, gaming consoles, or any other electronic device that might include such a connector 110 and/or mating port 102. In some embodiments, the electronic device 101 may be any other electronic device that processes data or images.

Referring to FIG. 1 again, the electronic device 101 can comprise a processor 103, and the processor 103 can be any processing component that processes electrical and/or optical I/O signals. It should be understood that a single processing device could be used, or multiple separate devices may be used. The processor 103 may include or be a microprocessor, programmable logic device or array, microcontroller, signal processor, or any combination thereof. Furthermore, the processor 103 may include any type of processing unit, such as, for example, CPU, multi-processing unit, a reduced instruction set computer (RISC), a processor that has a pipeline, a complex instruction set computer (CISC), digital signal processor (DSP), and the like.

Referring to FIG. 1 again, the mating port 102 of the electronic device 101 is configured to interface with the connector 110 of the optical cable module 100. The connector 110 is configured to allow a peripheral device 105 to interconnect with the electronic device 101. The connector 110 may support communication via an optical interface. In various embodiments, the connector 110 may also support communication via an electrical interface.

Referring to FIG. 1 again, the peripheral device 105 may be a peripheral I/O device. In various embodiments, the peripheral device 105 may be any of a number of computing devices, including, but not limited to, a desktop or laptop computer, a notebook, an Ultrabook, a tablet, a netbook, or other such computing devices. Besides computing devices, it should be understood that the peripheral device 105 may include handheld devices, smartphones, media devices, personal digital assistants (PDA), ultra-mobile personal computers, mobile phones, multimedia devices, memory devices, cameras, voice recorders, I/O devices, servers, set-top boxes, printers, scanners, monitors, televisions, electronic billboards, projectors, entertainment control units, portable music players, digital video recorders, networking devices, gaming devices, gaming consoles, or any other electronic device.

Referring to FIG. 1 again, the connector 110 of the present invention is configured to mate with the mating port 102 of the electronic device 101. As used herein, mating one connector with another may refer to providing a mechanical connection. The mating of one connector with another typically also provides a communication connection. The mating port 102 may include a housing 104, which may provide the mechanical connection mechanisms. The mating port 102 may also include one or more optical interface components. A path 106 may represent one or more components, which may include processing and/or termination components that convey an optical signal (or an optical signal and an electrical signal) between the processor 103 and the port 102. Conveying a signal may include the generation and conversion to optical, or the receiving and conversion to electrical.

Referring to FIG. 1 again, the connector 110 of the present invention may be referred to as an active optical connector or active optical receptacle and active optical plug. In general, such active optical connectors may be configured to provide the physical connection interface to a mating connector and an optical assembly.

Figure 2:
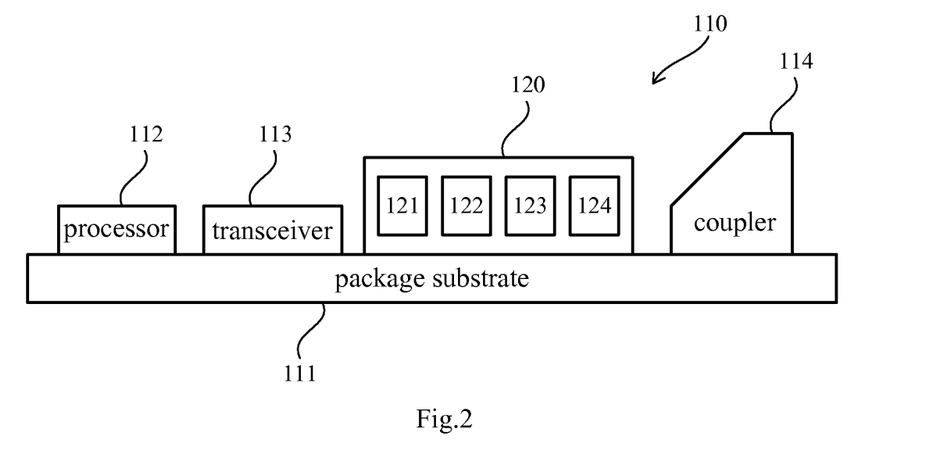
FIG. 2 is a block diagram showing the connector according to one embodiment of the present invention.

FIG. 2 is a block diagram showing the connector according to one embodiment of the present invention. The connector 110 can comprise a photoelectric component 120, a package substrate 111, a processor 112, a transceiver 113, and a coupler 114. The package substrate 111 may be a printed circuit board (PCB) or a ceramic substrate which includes mechanisms, such as pins or connection balls, for interfacing the system to an external device. The processor 112 is connected to the package substrate 111, and the processor 112 is intended to show any type of processor die, and is not limited to any particular processor type. The transceiver 113 may be a transmit/receive (Tx/Rx) chip, which could alternatively be included on the processor 112. The transceiver 113 includes transmit and receive circuits that transfer electrical signals, and more specifically process the timing or other protocol aspects of electrical signals corresponding to an optical signal. The transceiver 113 is connected to the processor 112 over the package substrate 111, such as through traces processed into the package substrate 111. In one embodiment, the transceiver 113 and the processor 112 can be flip-chip bonded to the package substrate 111.

Referring to FIG. 2 again, the coupler 114 provides a redirection mechanism to exchange light between the connector 110 and something external to this system (e.g., another device) over optical fibers (not shown). The coupler 114 can provide a redirection of optical signals via a reflection surface. The angle and general dimensions and shape of the coupler 114 are dependent on the wavelength of optical light rays, as well as the material used to make the coupler and the overall system requirements. In one embodiment, the coupler 114 is designed to provide redirection of vertical light from the package substrate 111 and of horizontal light to the package substrate 111.

Referring to FIG. 2 again, the photoelectric component 120 may be a light engine configured to generate and/or process the optical signals. The photoelectric component 120 can provide conversion from an electrical-to-optical signal or from an optical-to-electrical signal. The photoelectric component 120 can comprise at least one laser 121, a planar light-wave chip (PLC) 122, at least one photo-detector 123, and at least one modulator 124. It should be understood that the planar light-wave chip (PLC) 122 can be integrated into the coupler 114. The laser 121 can be any type of laser chip suitable for producing optical signals, such as an edge-emitting device or a vertical-cavity surface-emitting laser (VCSEL). The planar light-wave chip (PLC) 122 can provide a plane for the transfer of light and its conversion to electrical signals, and vice versa.

Herein, the photo-detector or modulator is not specifically illustrated. It should be understood that the photo-detector and modulator can be positioned on the same substrate as the coupler 114 to enable the transfer of light between the coupler and the electrical-optical circuits.

In one embodiment, the photoelectric component 120 may be configured to process the optical signals consistent with or in accordance with one or more communication protocols. For embodiments in which the connector 110 is configured to convey an optical signal and an electrical signal, it is not strictly necessary for the optical and electrical interfaces to operate according to the same protocol, but they may. Whether the photoelectric component 120 processes signals are in accordance with the protocol of the electrical I/O interface, or in accordance with a different protocol or standard, the photoelectric component 120 may be configured or programmed for an intended protocol within a particular connector, and different light engines may be configured for different protocols. In one embodiment, the photoelectric component 120 includes a laser diode to generate the optical signals, a photodiode to receive optical signals, and an optical IC to control the laser diode and the photodiode. In various embodiments, the laser diode comprises a VCSEL.

In various embodiments, a wavelength of at least one optical signal transmitted from the laser 121 of the photoelectric component 120 is within the range of the visible light spectrum or the near-infrared light spectrum. That is, the wavelength of the at least one optical signal transmitted from the laser 121 is in the range of 380 nm to 980 nm. In particular, the wavelength of the at least one optical signal transmitted from the laser 121 is in the range of 380 nm to 680 nm. That is, at least one optical signal transmitted from the laser 121, such as a visible laser, is visible.

Various communication protocols or standards may be used for embodiments in the present invention. Communication protocols may include, but are not limited to, mini DisplayPort (mDP), standard DisplayPort (DP), thunderbolt, Lightning port from the Apple company, mini universal serial bus (USB), micro universal serial bus (USB), standard USB, PCI express (PCIe), mobile high-definition link (MHL), or high-definition multimedia interface (HDMI). It should be understood that each different standard may include a different configuration or pinout for the electrical contact assembly. In addition, the size, shape and configuration of the connector may be dependent on the standard, including tolerances for the mating of the corresponding connectors. Thus, the layout of the connector to integrate the optical I/O assembly may be different for the various standards. As will be understood by those of skill in the art, optical interfaces require line-of-sight connections to have an optical signal transmitter interface with a receiver (both may be referred to as lenses). Thus, the configuration of the connector will be such that the lenses are not obstructed by the corresponding electrical contact assemblies if present. For example, optical interface lenses can be positioned to the sides of the contact assemblies, or above or below, depending on where space is available within the connector.

Moreover, as shown in FIG. 1, in practice, the peripheral device 105 may have various types. In the present invention, the optical cable module may be indirectly connected to the port of the peripheral device 105 through an adapter 107 to transmit signals between various communication protocols or standards. For example, the optical cable module of the present invention may have an HDMI port which is connected to a DP/Thunderbolt port of the peripheral device 105 (such as a cell phone, a mobile device, or a laptop computer) through an HDMI-DP/Thunderbolt adapter 107. In another case, the HDMI port of the optical cable module of the present invention may be connected to a Lightning port of the peripheral device 105 (such as an iPhone cell phone, a mobile device, or an iPad tablet) through an HDMI-Lightning adapter. Therefore, with the use of the adapter 107, a user can use the optical cable module of the present invention having one communication protocol (such as HDMI) to interface with various communication protocols or standards for transmitting signals. In practice, the adapter 107 may be a simple device for signal mirroring between various communication protocols.

Figure 3:
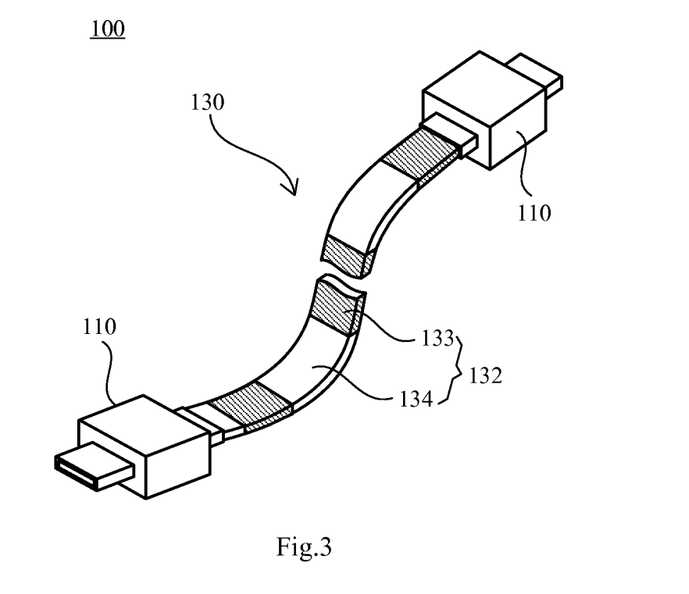
FIG. 3 is a schematic diagram showing the optical cable module according to one embodiment of the present invention.

FIG. 3 is a schematic diagram showing the optical cable module according to one embodiment of the present invention. In this embodiment, the optical cable 130 is connected to the connector 110 for transmitting optical signals. The optical cable 130 comprises at least one optical fiber 131 and an outer cladding layer 132. The optical fiber 131 is connected to the connector 110, and the optical signals are transmitted within the optical fiber 131. The outer cladding layer 132 can surround and cover the optical fiber 131 for protecting the structure of the optical fiber 131 as well as promoting the mechanical strength thereof.

In this embodiment, the optical cable 130 may have a plurality of optical fibers 131 to be a multi-core cable for transmitting various signals. In this case, the plurality of optical fibers 131 may be arranged in any manner. In one embodiment, the optical cable 130 may have one single optical fiber 131.

Referring to FIG. 3 again, the optical fibers 131 may be made of glass fiber, silicon oxide, silicon oxide glass, or plastic optical fiber (POF) for transmitting the optical signals. It should be understood that each of the optical fibers 131 includes a core and an inner cladding, and the optical signals are transmitted in the core by total internal reflection (TIR). In various embodiments, one end of the optical fiber 131 is coupled to the photoelectric component 120 of the connector 110 by a jumper. The optical signals emitted from the laser 121 of the photoelectric component 120 can be transmitted through the optical fiber 131 of the optical cable 130.

Figure 4:
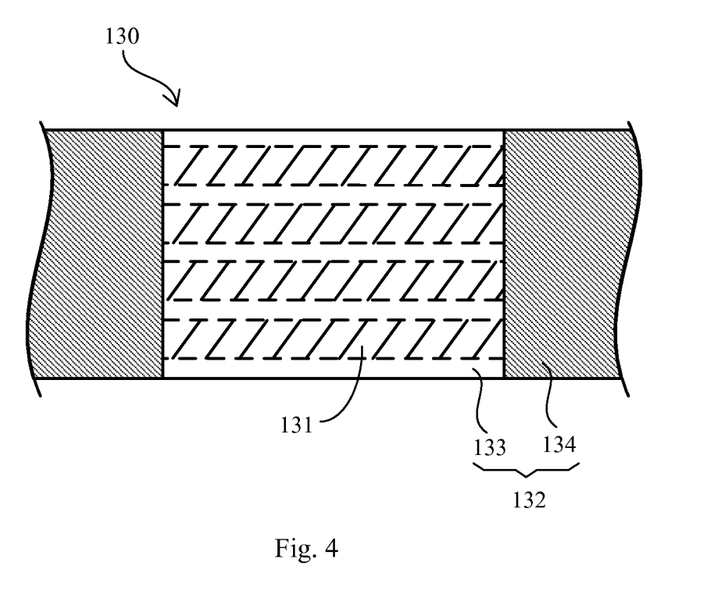
FIG. 4 is a schematic diagram showing a portion of the optical cable according to one embodiment of the present invention.
Figure 5:
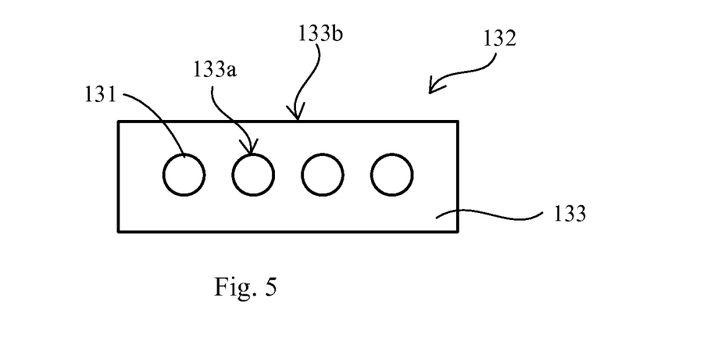
FIG. 5 is a cross-sectional view showing the optical cable in FIG. 4.
Figure 6:
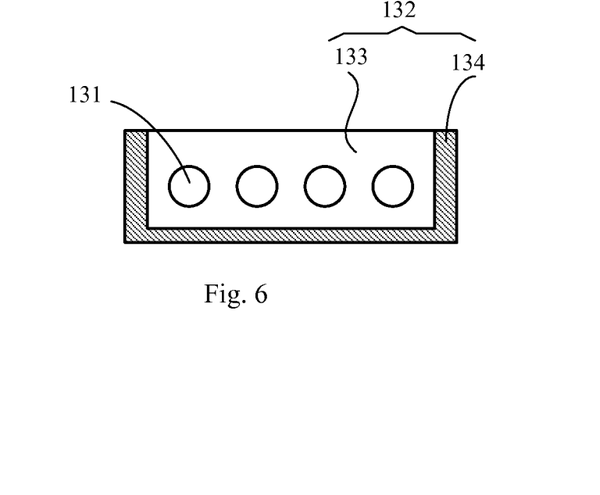
FIG. 6 is a cross-sectional view showing the optical cable according to another embodiment of the present invention.

Referring to FIGS. 4, 5, and 6, FIG. 4 is a schematic diagram showing a portion of the optical cable according to one embodiment of the present invention, FIG. 5 is a cross-sectional view showing the optical cable in FIG. 4, and FIG. 6 is a cross-sectional view showing the optical cable according to another embodiment of the present invention. The outer cladding layer 132 may be made of a plastic material, such as an epoxy resin or a silicone rubber. The outer cladding layer 132 includes at least one transparent portion 133, and at least one portion of the optical signals transmitted in the optical fiber 131 can pass through the transparent portion 133 of the outer cladding layer 132 to the surrounding environment. The transparent portion 133 is made of a transparent or translucent material, such that visible light rays can pass through the transparent portion 133. That is, a color light in the optical fiber 131 can be viewed through the transparent portion 133. The transparent portion 133 has an inner surface 133a and an outer surface 133b, wherein the inner surface 133a is in contact with the optical fiber 131, and the outer surface 133b is in contact with the external or the surrounding environment. The light rays (the optical signal) leaked from the optical fiber 131 may pass through the inner surface 133a and the outer surface 133b toward the surrounding environment.

In this embodiment, the laser 121 can emit at least one visible and optical signal to the optical fiber 131 of the optical cable 130. At this time, the visible and optical signal transmitted in the optical fiber 131 may pass through the transparent portion 133 to the outside, and at least one portion of the visible and optical signal may be viewed by the user.

When using the optical cable 130 to transmit signals, inevitably, a very small portion of the light rays (a weak light) will penetrate or scatter to the outer cladding layer 132 from the optical fiber 131. In particular, when the optical cable 130 is bent in use, the small portion of the light rays will more easily penetrate into the cladding layer 132 from a bent portion of the optical fiber 131. In this embodiment, with the use of the transparent portion 133 of the outer cladding layer 132, the weak and visible light from the optical fiber 131 can be viewed by the user through the transparent portion 133. In this manner, the weak and visible light penetrating through the transparent portion 133 can indicate a using status of the optical cable module 100 of the present embodiment, such as a status in transmitting signals or a status in supplying power. Moreover, with the use of the color light penetrating through the transparent portion 133, the appearance of the color of the optical cable module 100 is variable, thereby promoting an appearance of the optical cable module 100. In addition, the visible light penetrating through the transparent portion 133 can be used to visibly remind or warn the user of the existence of the optical cable 130, especially in a dark room.

Referring to FIGS. 4, 5, and 6 again, in this embodiment, the cladding layer 132 may further include at least one opaque portion 134, and the opaque portion 134 is positioned at one side of the transparent portion 133, or between the transparent portions 133, and the visible light leaked from the optical fiber 131 cannot be viewed through the opaque portion 134. In this case, the material of the opaque portion 134 may be identical to or different from the material of the transparent portions 133. The transparent portion 133 and the opaque portion 134 may be arranged in any shape or in any manner. For example, as shown in FIGS. 4 and 5, the transparent portion 133 and the opaque portion 134 may be alternately arranged in the outer cladding layer 132. In another embodiment, as shown in FIG. 6, a cross-sectional shape of the opaque portion 134 is U-shaped, and the transparent portion 133 is embedded in the recess of the U-shaped opaque portion 134, and the plurality of optical fibers 131 are embedded in the transparent portion 133.

Figure 7:
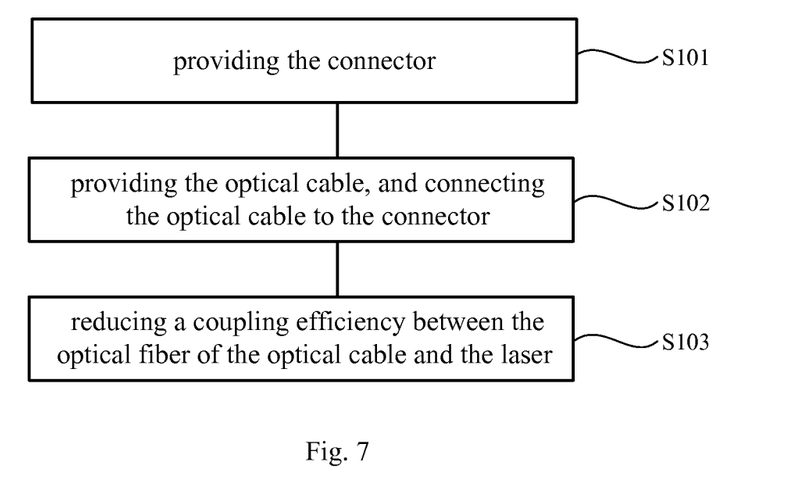
FIG. 7 is a flowchart of a method for manufacturing the optical cable module according to varied embodiments of the present invention.

FIG. 7 is a flowchart of a method for manufacturing the optical cable module 100 according to varied embodiments of the present invention. The present invention further provides a method for manufacturing the optical cable module 100. The method comprises the following steps: providing the connector 110 (step S101); providing the optical cable 130, and connecting the optical cable 130 to the connector 110 (step S102); and reducing a coupling efficiency between the optical fiber 131 of the optical cable 130 and the laser 121 (step S103). In step S103, by reducing the coupling efficiency of the optical fiber 131, such as to less than 70%, a specific proportion of the laser light will be scattered to the outer cladding layer 132 and transmitted along a direction of the optical fiber 131. In this case, with the use of the transparent portion 133 close to the connector 110, when the optical cable module 100 is connected to the peripheral device 105, the visible light penetrating through the transparent portion 133 can indicate the using status of the optical cable module 100 more clearly, especially in a dark room or a dark environment.

In one embodiment, the coupling efficiency between the optical fiber 131 of the optical cable 130 and the laser 121 can be reduced by slightly deviating the optical fiber 131 from the coupler 114. That is, a very small offset value in the connection between the optical fiber 131 and the coupler 114 is allowed to decrease the coupling efficiency of the optical fiber 131.

In one embodiment, the coupling efficiency between the optical fiber 131 of the optical cable 130 and the laser 121 can be reduced by slightly varying a lens curvature of a lens of the coupler 114.

In one embodiment, the optical cable 130 may have the plurality of optical fibers 131, and the coupling efficiency of at least one of optical fibers 131 is less than the coupling efficiencies of the other optical fibers 131. That is, at least one of optical fibers 131 has the decreased coupling efficiency for allowing more light rays to be scattered into the outer cladding layer 132.

Figure 8:
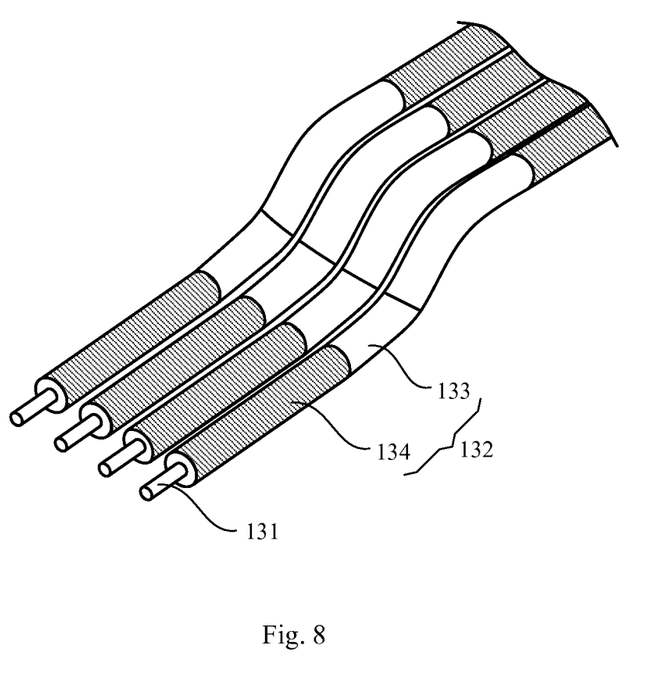
FIG. 8 is a schematic diagram showing the optical cable according to one embodiment of the present invention.

FIG. 8 is a schematic diagram showing the optical cable according to one embodiment of the present invention. In this embodiment, the outer cladding layer 132 of the optical cable 130 can surround the plurality of optical fibers 131. As shown in FIG. 8, in one embodiment, a plurality of outer cladding layers 132 can surround the plurality of optical fibers 131, respectively.

In varied embodiments, the transparent portion 133 of the outer cladding layer 132 may be flexible. In one embodiment, a flexibility of the transparent portion 133 is greater than a flexibility of the opaque portion 134. That is, in comparison with the opaque portion 134, the transparent portion 133 is more flexible. Therefore, when the transparent portion 133 of the outer cladding layer 132 is bent in use, more light rays will be leaked from the optical fiber 131 to the transparent portion 133 of the outer cladding layer 132. In this manner, more visible light can be viewed through the flexible transparent portion 133. In various embodiments of the present invention, a material and/or diameter of the transparent portion 133 is different to a material and/or diameter of the opaque portion 134, thereby forming the different flexibility there-between.

In varied embodiments, a refractive index of the transparent portion 133 of the outer cladding layer 132 may be identical to or close to a refractive index of the inner cladding layer of the optical fiber 131, thereby allowing the light leaked from the optical fiber 131 to more likely penetrate into the transparent portion 133. In one embodiment, a difference between refractive indexes of the optical fiber 131 and the transparent portion 133 is less than a difference between refractive indexes of the optical fiber 131 and the opaque portion 134. That is, in comparison with the opaque portion 134, the light leaked from the optical fiber 131 can more easily penetrate into the transparent portion 133. Therefore, when the optical cable 130 is bent in use, more light rays can penetrate into the transparent portion 133, and be viewed by the user.

When the optical cable module 100 is unused or unable to work, there is no optical signal transmitted in the optical cable 130. At this time, since there is no visible light leaked from the optical fiber 131, the transparent portion 133 of the outer cladding layer 132 may be transparent, i.e. the color or appearance of the transparent portion 133 is not varied, so as to inform the user that the optical cable module 100 is in an unused status. In contrast, when the optical cable module 100 is used to transmit signals, especially when the optical cable module 100 is connected to handheld devices for transmitting signals, the weak and visible light can be emitted out the outer cladding layer 132 through the transparent portion 133, and the transparent portion 133 can have varied colors, so as to inform the user that the optical cable module 100 is in an used status, i.e. the status in transmitting signals. In this manner, the user can ascertain the using status of the optical cable module 100 by the color or appearance of the optical cable 130. Furthermore, the optical cable 130 of the optical cable module 100 can have varied colors for promoting the appearance thereof, thereby being suitable for consumer electronic products. In addition, the visible light penetrating through the optical cable 130 can be used to visibly remind or warn the user of the existence of the optical cable module 100, especially in a dark environment.

When the optical cable 130 has the plurality of optical fibers 131, multiple wavelengths can be used to achieve a specific mixed light of a mixed optic color for indicating a specific signal transmission in the optical cable 130, and various product designs with individual light colors are available.

Figure 9:
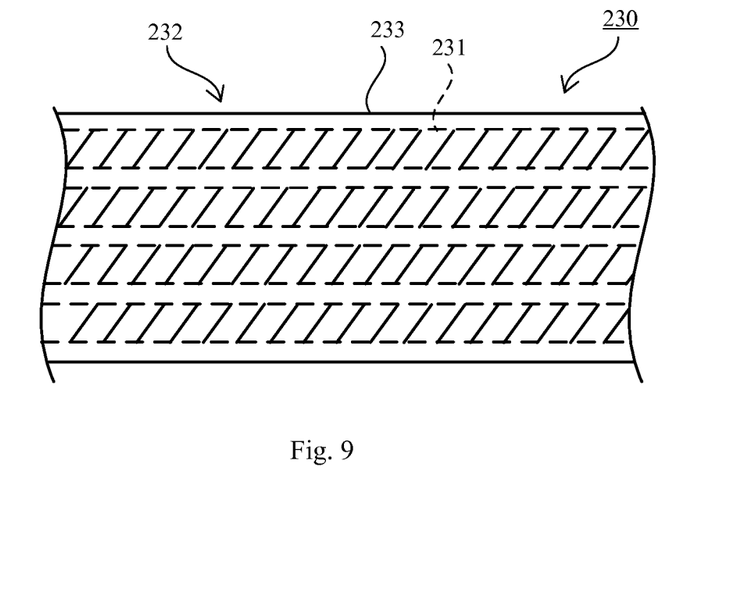
FIG. 9 is a schematic diagram showing a portion of the optical cable according to one embodiment of the present invention.

FIG. 9 is a schematic diagram showing a portion of the optical cable according to one embodiment of the present invention. In one embodiment, the optical cable 230 comprises a plurality of optical fibers 231 and an outer cladding layer 232, and the outer cladding layer 232 can surround and cover the optical fibers 231. In this case, all parts or large parts of the outer cladding layer 232 are transparent. That is, all parts or large parts of the outer cladding layer 232 can be the transparent portion 233 for allowing the visible light leaked from the optical fiber 231 to pass through the outer cladding layer 232 (the transparent portion 233) toward the outside. Therefore, in this embodiment, with the use of the transparent cladding layer 232, the appearance of the optical cable 230 can be improved. In one embodiment, all parts or large parts of the outer cladding layer 232 may be made of a transparent polymer material, so as to form the transparent portion 233. In one embodiment, more than 80% of the outer cladding layer 232 can be transparent.

Figure 10:
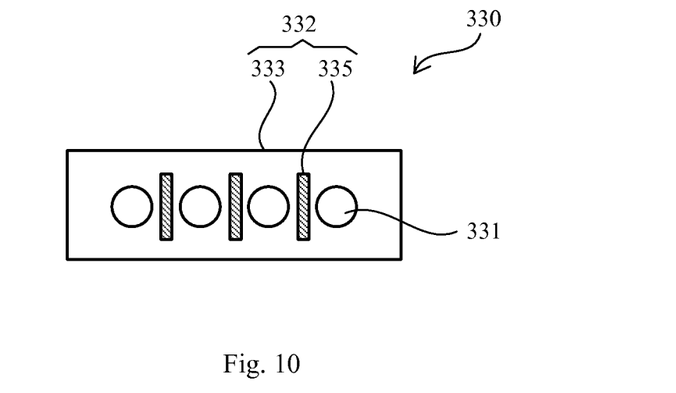
FIGS. 10 and 11 are cross-sectional views showing the optical cable according to one embodiment of the present invention.
Figure 11:
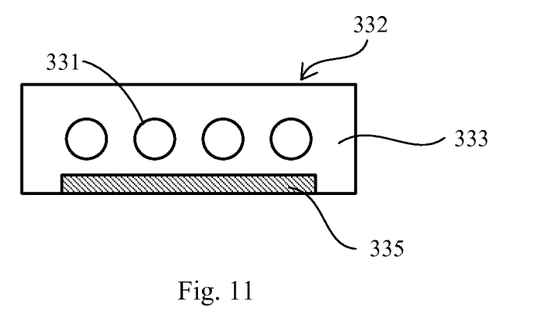

Referring to FIGS. 10 and 11, FIGS. 10 and 11 are cross-sectional views showing the optical cable according to one embodiment of the present invention. In one embodiment, the optical cable 330 comprises a plurality of optical fibers 331 and an outer cladding layer 332, and the outer cladding layer 332 can surround and cover the optical fibers 331. In this case, the outer cladding layer 332 includes at least one transparent portion 333 and at least one reflective portion 335, and the at least one reflective portion 335 is positioned in the transparent portion 333 or on a surface of the transparent portion 333, so as to reflect the visible light leaked from the optical fiber 331. Therefore, in this embodiment, with the use of the reflective portion 335, the visible light passing through the transparent portion 333 can be more prominent, and the visibility and appearance of the optical cable 330 can be improved. The reflective portion 335 may be made of a reflective material. The reflective material may be Ag, Al, Au, Cr, Cu, In, Ir, Ni, Pt, Re, Rh, Sn, Ta, W, Mn, white paint with etiolation-resistant and heat-resistant properties, or any combination thereof. In one embodiment, the reflective portion 335 may be made of a metal with a high reflectivity, and embedded in the transparent portion 333.

Figure 12:
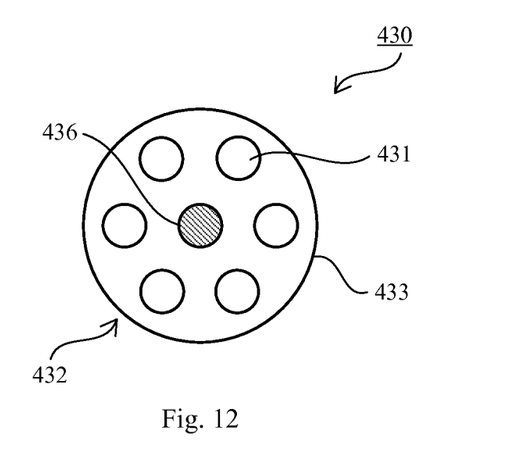
FIG. 12 is a cross-sectional view showing the optical cable according to one embodiment of the present invention.

FIG. 12 is a cross-sectional view showing the optical cable according to one embodiment of the present invention. In one embodiment, the optical cable 430 comprises a plurality of optical fibers 431, an outer cladding layer 432 and a power line 436, and the outer cladding layer 432 can surround and cover the optical fibers 431 and the power line 436. The optical fibers 431 are configured to transmit signals, and the power line 436 is configured to supply electrical power. With the use of the power line 436 integrated into the optical cable 430, the optical cable 430 can directly supply power to an electronic device without connecting to an external power source. In one embodiment, the optical fibers 431 and the power line 436 are arranged in a honeycomb-shaped manner. In this manner, the structure of the optical cable 430 can be strengthened, thereby improving the mechanical strength and reliability of the optical cable, as well as reducing the requirements for repair or maintenance. In this case, the power line 436 is made of a metal with a high reflectivity and is positioned in the middle of the optical fibers 431, and the optical fibers 431 can surround the power line 436. Therefore, the visible light rays leaked from the optical fibers 431 can be reflected by the power line 436, and pass through the transparent portion 433, and the visibility and appearance of the optical cable 430 can be improved.

Figure 13:
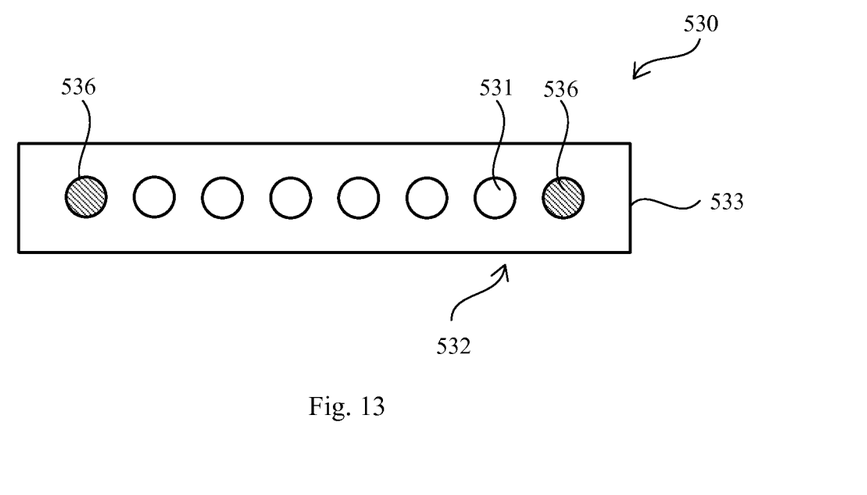
FIG. 13 is a cross-sectional view showing the optical cable according to one embodiment of the present invention.

FIG. 13 is a cross-sectional view showing the optical cable according to one embodiment of the present invention. In one embodiment, the optical cable 530 comprises a plurality of optical fibers 531, an outer cladding layer 532 and at least two metal lines 536, and the outer cladding layer 532 can surround and cover the optical fibers 531 and the metal lines 536. The optical fibers 531 are configured to transmit signals, and at least one of the metal lines 536 can supply electrical power. In the optical cable 530, the at least two metal lines 536 are symmetrically arranged in the outer cladding layer 532. For example, the at least two metal lines 536 may be positioned at two opposite sides of the optical cable 530, respectively. With the use of the symmetrical metal lines 536, the structure of the optical cable 530 can be strengthened, thereby improving the mechanical strength and reliability of the optical cable, as well as reducing the requirements for repair or maintenance. In one embodiment, the metal lines 536 are made of a metal with a high reflectivity, the visible light rays leaked from the optical fibers 531 can be reflected by the metal lines 536, and pass through the transparent portion 533, and the visibility and appearance of the optical cable 530 can be improved. In practice, the optical cable 530 can be rolled and received in a reel for easily carrying, and in rolling or bending the optical cable 530, the symmetrical metal lines 536 can enhance the mechanical strength and reliability of the optical cable 530.

As described above, the optical cable module of the present invention can indicate the using status thereof, and the optical cable of the optical cable module can have varied colors for promoting the appearance thereof, thereby being suitable for consumer electronic products.

Various aspects of the illustrative implementations are described herein using terms commonly employed by those skilled in the art to convey the substance of their work to others skilled in the art. It will be apparent to those skilled in the art, however, that embodiments of the present invention may be practiced with only some of the described aspects. For purposes of explanation, specific numbers, materials and configurations are set forth in order to provide a thorough understanding of the illustrative implementations. It will be apparent to one skilled in the art, however, that embodiments of the present invention may be practiced without the specific details. In other instances, well-known features are omitted or simplified in order not to obscure the illustrative implementations.

Flow diagrams illustrated herein provide examples of sequences of various process actions which may be performed by processing logic that may include hardware, software, or a combination thereof. Furthermore, various operations are described as multiple discrete operations, in turn, in a manner that is most helpful in understanding the illustrative embodiments; however, the order of description should not be construed as to imply that these operations are necessarily order dependent. Thus, the illustrated implementations should be understood only as examples, and the processes can be performed in a different order, and some actions may be performed in parallel, unless otherwise specified.

Moreover, methods within the scope of this disclosure may include more or fewer steps than those described.

The phrases "in some embodiments" and "in various embodiments" are used repeatedly. These phrases generally do not refer to the same embodiments; however, they may. The terms "comprising", "having", and "including" are synonymous, unless the context dictates otherwise.

Although various example methods, apparatuses, and systems have been described herein, the scope of coverage of the present disclosure is not limited thereto. On the contrary, the present disclosure covers all methods, apparatus, systems, and articles of manufacture fairly falling within the scope of the appended claims, which are to be construed in accordance with established doctrines of claim interpretation. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

The present invention has been described with preferred embodiments thereof, and it is understood that many changes and modifications to the described embodiments can be carried out without departing from the scope and the spirit of the invention that is intended to be limited only by the appended claims.

The invention claimed is:

1. An optical cable module, comprising:
a connector comprising a photoelectric component, wherein the photoelectric component includes at least one laser for producing a plurality of optical signals to transmit video or data signals, and a wavelength of at least one of the plurality of optical signals is within a visible light spectrum; and
an optical cable connected to the connector for transmitting the at least one optical signal, wherein the optical cable comprises at least one optical fiber, an outer cladding layer and at least one reflective portion, and the outer cladding layer surrounds the at least one optical fiber, and the outer cladding layer includes at least one transparent portion and at least one opaque portion, and at least one portion of the optical signals is leaked from the optical fiber and passes through the transparent portion to a surrounding environment, and a material and/or a diameter of the transparent portion is different from a material and/or a diameter of the opaque portion, and the at least one portion of the optical signals leaked from the optical fiber includes the video or data signals,
wherein a coupling efficiency between the at least one optical fiber and the laser is adjusted to be reduced relative to a maximum attainable coupling efficiency in order to generate the leaked portion of the optical signals, and
wherein a cross-sectional shape of the outer cladding layer is a rectangle, and the optical cable is configured to be rolled and received in a reel.

2. The optical cable module according to claim 1, wherein more than 80% of the outer cladding layer is transparent, and wherein the at least one reflective portion is at least one metal line positioned in the transparent portion.

3. The optical cable module according to claim 1, wherein a coupling efficiency between the at least one optical fiber and the laser is adjusted to be less than 70% of the maximum attainable coupling efficiency.

4. The optical cable module according to claim 1, wherein the wavelength of at least one optical signal is in a range of 380 nm to 680 nm.

5. The optical cable module according to claim 1, wherein the at least one optical fiber comprises a plurality of optical fibers corresponding to the plurality of optical signals.

6. An optical cable module, comprising:
a connector comprising a photoelectric component, wherein the photoelectric component includes at least one laser for producing at least one optical signal for transmitting video or data signals, and a wavelength of at least one optical signal is in a range of 380 nm to 980 nm; and
an optical cable connected to the connector for transmitting the at least one optical signal, wherein the optical cable comprises at least one optical fiber and an outer cladding layer, and the outer cladding layer surrounds the at least one optical fiber, and the outer cladding layer includes at least one transparent portion and at least one reflective portion, and at least one portion of the optical signal is leaked from the optical fiber and passes through the transparent portion to a surrounding environment, and the at least one portion of the optical signal leaked from the optical fiber includes the video or data signals,
wherein a coupling efficiency between the at least one optical fiber and the laser is adjusted to be reduced relative to a maximum attainable coupling efficiency in order to generate the leaked portion of the optical signal.

7. The optical cable module according to claim 6, wherein the wavelength of the at least one optical signal is in a range of 380 nm to 680 nm.

8. The optical cable module according to claim 6, wherein the at least one optical signal comprises a plurality of optical signals, and a wavelength of at least one of the plurality of optical signals is within a visible light spectrum.

9. The optical cable module according to claim 8, wherein the at least one optical fiber comprises a plurality of optical fibers corresponding to the plurality of optical signals.

10. The optical cable module according to claim 9, wherein the photoelectric component comprises a plurality of lasers and wherein a coupling efficiency of at least one of optical fibers to the plurality of lasers is less than coupling efficiencies of the other optical fibers to the lasers.

11. The optical cable module according to claim 6, wherein the cladding layer further includes at least one opaque portion, and the opaque portion is positioned at one side of the transparent portion, or between the transparent portions.

12. The optical cable module according to claim 11, wherein a flexibility of the transparent portion is greater than a flexibility of the opaque portion.

13. The optical cable module according to claim 11, wherein a difference between refractive indexes of the optical fiber and the transparent portion is less than a difference between refractive indexes of the optical fiber and the opaque portion.

14. The optical cable module according to claim 11, wherein the transparent portion and the opaque portion are alternately arranged in the outer cladding layer.

15. The optical cable module according to claim 11, wherein a cross-sectional shape of the opaque portion is U-shaped, and the transparent portion is embedded in a recess of the U-shaped opaque portion.

16. The optical cable module according to claim 6, wherein the coupling efficiency between the at least one optical fiber and the laser is adjusted to be less than 70% of the maximum attainable coupling efficiency.

17. The optical cable module according to claim 6, wherein the coupling efficiency is reduced by deviating the optical fiber from a coupler of the connector.

18. The optical cable module according to claim 6, wherein the coupling efficiency is reduced by varying a lens curvature of a lens of a coupler of the connector.

19. The optical cable module according to claim 6, wherein the optical cable comprises at least two metal lines, and the at least two metal lines are symmetrically arranged in the outer cladding layer.

20. The optical cable module according to claim 6, wherein the optical cable is configured to be rolled and received in a reel.

21. The optical cable module according to claim 6, wherein more than 80% of the outer cladding layer is transparent, and wherein the at least one reflective portion is at least one metal line positioned in the transparent portion.

22. A method for manufacturing an optical cable module, comprising:
providing a connector, wherein the connector comprises a photoelectric component, and the photoelectric component includes at least one laser for producing at least one optical signal to transmit video or data signals, and a wavelength of at least one optical signal is in a range of 380 nm to 980 nm;
providing an optical cable, and connecting the optical cable to the connector, wherein the optical cable comprises at least one optical fiber and an outer cladding layer, and the outer cladding layer surrounds the at least one optical fiber, and the outer cladding layer includes at least one transparent portion, and at least one portion of the optical signal is leaked from the optical fiber and passes through the transparent portion to a surrounding environment, and the at least one portion of the optical signal leaked from the optical fiber includes the video or data signals; and
reducing a coupling efficiency between the optical fiber of the optical cable and the laser to be less than a maximum attainable coupling efficiency in order to generate the leaked portion of the optical signal.

23. The method according to claim 22, wherein the coupling efficiency is reduced by deviating the optical fiber from a coupler of the connector.

24. The method according to claim 22, wherein the coupling efficiency is reduced by varying a lens curvature of a lens of a coupler of the connector.

25. The method according to claim 22, wherein more than 80% of the outer cladding layer is transparent, and wherein at least one metal line is positioned in the transparent portion.

26. The method according to claim 22, wherein the coupling efficiency between the optical fiber of the optical cable and the laser is reduced to be less than 70% of the maximum attainable coupling efficiency.

* * * * *